Sept. 7, 1926.
S. M. KASS
1,599,278
PIPE REPAIR CLAMP AND RADIO GROUND
Filed Oct. 2, 1924
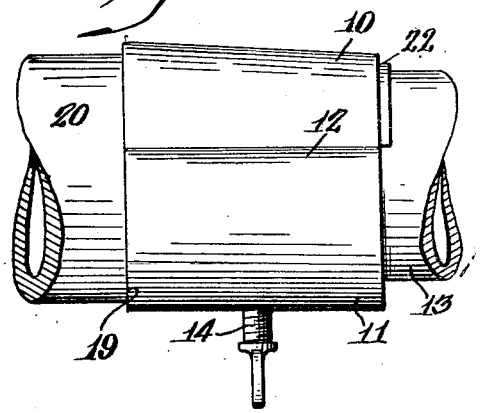
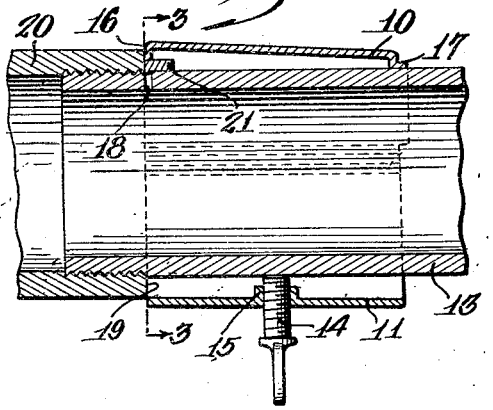
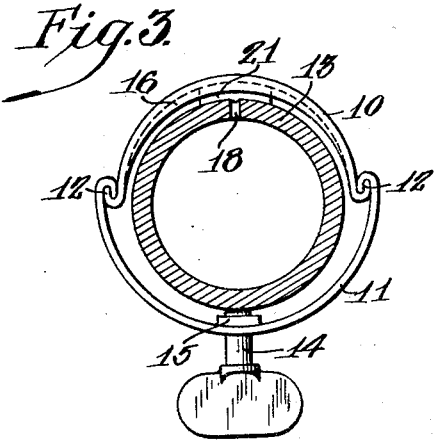
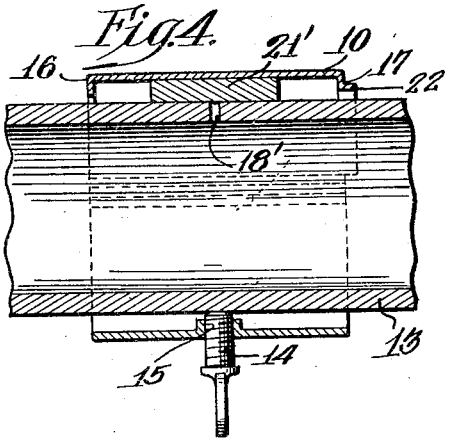
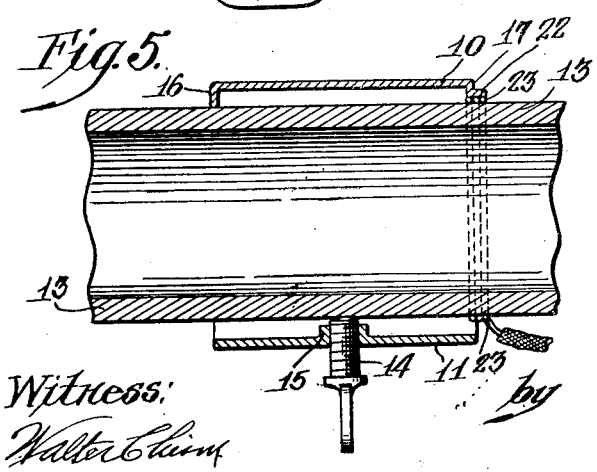
Inventor
Samuel M. Kass.
Witness:

Patented Sept. 7, 1926.

1,599,278

UNITED STATES PATENT OFFICE.

SAMUEL M. KASS, OF PHILADELPHIA, PENNSYLVANIA.

PIPE-REPAIR CLAMP AND RADIO GROUND.

Application filed October 2, 1924. Serial No. 741,210.

My invention relates to pipe repair clamps adapted specially to repair leaks at shoulders, as from under the ends of sleeves and other fittings.

A purpose of my invention is to inwardly flange one end of the clamping element of a clincher joint pipe repair clamp in order to concentrate clamping pressure at that end.

A further purpose is preferably to inwardly flange both ends of the clamping element in order better to adapt the clamp for use either at or away from shoulders as well as to present a better appearance.

A further purpose is to provide a tightening-screw with a nut within and integral with one member of a pair of inter-clinching clamp members by piercing and swaging the sheet metal of the member to form an interior tubular boss and tapping the boss for the screw.

A further purpose is to adapt a clamp of the general character described to highly efficient use as a ground clamp for electric circuits.

Further purposes will appear in the text and in the claims.

I have illustrated my invention by but one form, selecting a form which has proved to be practical, efficient and inexpensive, and which at the same time well illustrates the principles of my invention.

Figure 1 is a side elevation showing my repair clamp stopping a pipe leak at the end of a sleeve.

Figure 2 is a central section of Figure 1 in the plane of the paper.

Figure 3 is a section of Figure 2 taken upon the line 3—3.

Figure 4 is a section similar to Figure 2 but showing the clamp stopping a leak in a straight length of pipe.

Figure 5 is a section similar to Figure 2, but showing the clamp in use as a ground clamp.

In the drawings similar numerals indicate like parts.

Describing in illustration and not in limitation and referring to the drawings:

A desirable form of clamp is disclosed and described in my U. S. Letters Patent No. 1,487,337, dated March 18, 1924, and I aim better to adapt a clamp of this type to use in stopping leaks at shoulders while not interfering with its use in straight lengths of pipe or with its good appearance.

Co-operating clamp members 10 and 11 have longitudinal clincher joints 12 and completely surround the pipe 13. A screw 14 threading through a nut 15 located inside the member 11 engages one side of the pipe, the clamping action being between the other side of the pipe and the member 10. The nut is here formed within an inwardly-turned sleeve integral with the metal of one of the clamp members.

I have discovered that the nut 15 may be made integral with the member 11 economically by piercing and swaging the sheet metal in a tubular boss 16 which is subsequently converted into a nut by tapping for the screw 14.

Clamps of this type have hitherto been quite effective when there was room to place the clamp with its screw substantially opposite the leak, but much less effective with leaks at the ends of fittings, such as couplings, T's, L's and caps, since the shoulder of the adjacent fitting then prevents the clamp from properly extending over the leak.

I have discovered that inwardly flanging one end of the clamping element 10, as at 16, makes the clamp much better adapted to stopping leaks at shoulders, and that it is advantageous to also inwardly flange the other end, as at 17, though preferably to a less extent.

In Figures 1 to 3, the leak 18 adjacent the shoulder 19 of the fitting 20 is covered with usual packing 21 and the inwardly directed flange 16 presses into the packing just above the leak, effectively closing the leak. Where it is desired to compress the packing over a larger area, the clamp can be reversed to use the flange 17 which is provided with a preferably cylindrical extension 22 which will engage with a wider strip or extent of packing. Where this form is preferred, both edges may be thus extended, giving different lengths axially of the shaft to the extension.

It will be seen that the packing is compressed into the leak with great intensity, the whole reaction of the pipe against the clamping element 10 being supported against the bearing edges of the flanges 16 and 17.

Figure 4 illustrates the clamp closing a leak 18′ in a straight length of pipe. Sufficient packing 21′ is placed over the leak to relieve the flanges 16 and 17 from pressure against the pipe, the flanges then functioning merely to add somewhat to the good appearance of the clamp.

Obviously the flanges may be of the same depths (nearly radially) to obtain a part of the advantage or of different radial depths, using the longer against the packing so that the longitudinal component (parallel to the pipe axis) of the inward swing of the flange as it is brought to position, will tend to shove the packing longitudinally of the pipe and against the shoulder. If desired, one of the flanges may be omitted altogether.

In Figure 5 the clamp is used as a ground clamp to grip a coil of wire 23 about any section of pipe tightly against the pipe for good contact, preferably using an end having an extension 22 so as to avoid cutting the wire and to increase the area of wire clamped.

In view of my invention and disclosure variations and modifications to meet individual whim or particular need will doubtless become evident to others skilled in the art, and I therefore claim all such in so far as they fall within the reasonable spirit and scope of my invention.

Having thus described my invention, what I claim as new and desire to secure by Letters Patent is:—

1. In a pipe repair clamp, two clamp members united by clincher joints and together surrounding the pipe, screw means for tightening the clamp, and an inwardly directed flange on one end of one of the clamping members.

2. In a pipe repair clamp, two clamp members united by clincher joints and together surrounding the pipe, screw means for tightening the clamp, and an inwardly directed flange at each end of one of the clamping members.

3. In a pipe repair clamp, two clamp members united by clincher joints and surrounding the pipe, an integral apertured and threaded sleeve in part punched from the material of the clamp member and extending inwardly from one of them and a screw within the sleeve adapted to engage the pipe.

SAMUEL M. KASS.